(12) United States Patent
Seitz et al.

(10) Patent No.: US 12,259,275 B2
(45) Date of Patent: Mar. 25, 2025

(54) CONTROL DEVICE, OPTICAL FILTER SYSTEM, AND CONTROL METHOD

(71) Applicant: HAMAMATSU PHOTONICS K.K., Hamamatsu (JP)

(72) Inventors: Peter Seitz, Solothurn (CH); Helmut Teichmann, Solothurn (CH); Katsumi Shibayama, Hamamatsu (JP); Takashi Kasahara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 868 days.

(21) Appl. No.: 17/294,051

(22) PCT Filed: Sep. 9, 2019

(86) PCT No.: PCT/JP2019/035403
§ 371 (c)(1),
(2) Date: May 14, 2021

(87) PCT Pub. No.: WO2020/129329
PCT Pub. Date: Jun. 25, 2020

(65) Prior Publication Data
US 2022/0003603 A1 Jan. 6, 2022

(30) Foreign Application Priority Data
Dec. 18, 2018 (JP) .................................. 2018-236338

(51) Int. Cl.
*G02B 5/28* (2006.01)
*G01J 3/26* (2006.01)
*G02B 26/00* (2006.01)

(52) U.S. Cl.
CPC ............... *G01J 3/26* (2013.01); *G02B 5/284* (2013.01); *G02B 26/001* (2013.01)

(58) Field of Classification Search
CPC .......... G01J 3/26; G01J 3/2823; G01J 3/0208; G01J 2003/1226; G01J 9/02; G01J 3/45;
(Continued)

(56) References Cited

U.S. PATENT DOCUMENTS

2009/0306479 A1* 12/2009 Kamihara ............ A61B 1/0655
356/454
2012/0200926 A1* 8/2012 Matsushita .......... G01N 21/251
359/578
(Continued)

FOREIGN PATENT DOCUMENTS

CN 101051096 B 5/2010
CN 102636829 A 8/2012
(Continued)

OTHER PUBLICATIONS

International Preliminary Report on Patentability mailed Jul. 1, 2021 for PCT/JP2019/035403.

*Primary Examiner* — Darryl J Collins
*Assistant Examiner* — Matthew Y Lee
(74) *Attorney, Agent, or Firm* — Faegre Drinker Biddle & Reath LLP (57) ABSTRACT

Provided is a control device for controlling a Fabry-Perot interference filter having a pair of mirror parts and a pair of driving electrodes. The control device includes: a first driving source that is controlled by using a current as a control parameter, and changes the distance between the pair of mirror parts; a second driving source that is controlled by using a voltage as a control parameter, and changes the distance; and a control unit that controls the first driving source and the second driving source in such a way that the distance is changed by a first driving source in a first region and the distance is changed by the second driving source in at least one part of an region other than the first region when an region including a maximum of the voltage is defined as the first region.

14 Claims, 5 Drawing Sheets

(58) Field of Classification Search
CPC ...... G01J 3/0264; G01J 3/027; G02B 26/001; G02B 6/29395; G02B 6/29379; G02B 5/28; G02B 5/284; G02B 6/29361; G02B 2006/12159; G02B 6/29358; G02B 1/11; G02B 26/0841; H01S 3/1062; G02F 1/21; G02F 1/213; G02F 1/133521

See application file for complete search history.

(56) References Cited

U.S. PATENT DOCUMENTS

| | | | | |
|---|---|---|---|---|
| 2014/0009761 A1* | 1/2014 | Nishimura | ............. | G01J 3/027 356/402 |
| 2014/0211315 A1* | 7/2014 | Matsushita | ............. | G01J 3/027 359/578 |
| 2016/0164255 A1* | 6/2016 | Poustie | ................. | H01S 5/0654 359/239 |
| 2016/0359074 A1* | 12/2016 | Melloni | ............ | H01L 31/02325 |
| 2018/0284422 A1* | 10/2018 | Kuri | ......................... | G01J 3/027 |
| 2019/0219622 A1* | 7/2019 | Okuda | .................. | G02B 5/284 |
| 2020/0103721 A1* | 4/2020 | Matsuno | .............. | G02B 26/001 |

FOREIGN PATENT DOCUMENTS

| | | |
|---|---|---|
| CN | 103576311 A | 2/2014 |
| CN | 104516100 A | 4/2015 |
| CN | 105339829 A | 2/2016 |
| JP | H10-221661 A | 8/1998 |
| JP | 2004-334201 A | 11/2004 |
| JP | 2014-145888 A | 8/2014 |
| JP | 2015-4886 A | 1/2015 |
| TW | 201331637 A | 8/2013 |
| WO | WO 2015/122316 A1 | 8/2015 |

* cited by examiner

CONTROL DEVICE, OPTICAL FILTER SYSTEM, AND CONTROL METHOD

TECHNICAL FIELD

One aspect of the present disclosure relates to a control device, an optical filter system, and a control method.

BACKGROUND ART

A Fabry-Perot interference filter having a pair of mirror parts facing each other with an air gap therebetween and a pair of driving electrodes facing each other with the air gap therebetween, and having a distance between the mirror parts changed in accordance with a potential difference between the driving electrodes is known (for example, refer to Patent Literature 1).

CITATION LIST

Patent Literature

Patent Literature 1: Japanese Unexamined Patent Publication No. 2015-004886

SUMMARY OF INVENTION

Technical Problem

In the above Fabry-Perot interference filter, the distance between the mirror parts is generally adjusted by control of an applied voltage applied to the driving electrodes, while a mechanical spring is providing a counter-active force between the mirror parts. However, in this case, there is a concern that a pull-in phenomenon occurs. In the pull-in phenomenon, driving electrodes apply an attractive force to each other that cannot be compensated by the mechanical spring, and the mirror parts firmly come into mechanical contact with each other, so that there is a concern that failure occurs in the Fabry-Perot interference filter. On the other hand, in order to avoid the pull-in phenomenon, it is considered that control based on an applied current is employed. However, when the control based on an applied current is merely employed, there is a concern that control becomes complicated.

An object of one aspect of the present disclosure is to provide a control device, an optical filter system, and a control method capable of simplifying control while avoiding a pull-in phenomenon.

Solution to Problem

A control device according to one aspect of the present disclosure is a control device for controlling a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the control device comprising: a first driving source that is controlled by using a current as a control parameter, and changes the distance between the pair of mirror parts; a second driving source that is controlled by using a voltage as a control parameter, and changes the distance between the pair of mirror parts; and a control unit that controls the first driving source and the second driving source in such a way that the distance between the pair of mirror parts is changed by a first driving source in a first region and the distance between the pair of mirror parts is changed by the second driving source in at least one part of an region other than the first region when an region including a maximum of the voltage in relation between the charges stored between the pair of driving electrodes, and the voltage between the pair of driving electrodes is defined as the first region.

In this control device, in the first region including the maximum of the voltage, the distance between the mirror parts is changed by the first driving source controlled by using the current as the control parameter, and in at least the one part of the region other than the first region, the distance between the mirror parts is changed by the second driving source controlled by using the voltage as the control parameter. A pull-in phenomenon can be avoided by use of the first driving source in the first region. Furthermore, the second driving source is used in at least the one part of the region other than the first region, so that control can be simplified compared to a case in which the first driving source is used in the whole region, for example. This is because while the voltage between the driving electrodes needs to be monitored to be feedback-controlled in a case of the first driving source controlled by using the current as the control parameter, feed-forward control can be performed in a case of the second driving source controlled by using the voltage as the control parameter. Therefore, according to this control device, it is possible to simplify the control while avoiding the pull-in phenomenon.

The control unit may control the first driving source and the second driving source in such a way that the distance between the pair of mirror parts is changed by the second driving source in a second region when an region in which the charges are larger than the charges in the first region in the relation is defined as the second region. In this case, it is possible to control the distance between the mirror parts in the second region by simple control.

The second driving source may have a first driving unit, the first driving unit may be configured in such a way that: when a control voltage of the first driving unit is larger than the voltage generated between the pair of driving electrodes, the distance between the pair of mirror parts increases; and when the control voltage of the first driving unit is smaller than the voltage generated between the pair of driving electrodes, the distance between the pair of mirror parts decreases, and the control unit may control the first driving source and the second driving source in such a way that the distance between the pair of mirror parts is changed by the first driving unit in the second region. In this case, it is possible to more suitably control the distance between the mirror parts in the second region.

The first driving unit may include an operational amplifier, and in the operational amplifier, a non-inverting input terminal may be connected to an output terminal, the output terminal may be connected to the Fabry-Perot interference filter, and the control voltage may be applied to an inverting input terminal. In this case, it is possible to more suitably control the distance between the mirror parts in the second region.

The control unit may control the first driving source and the second driving source in such a way that the distance between the pair of mirror parts is changed by the second driving source in a third region when an region in which the charges are smaller than the charges in the first region in the relation is defined as the third region. In this case, it is possible to control the distance between the mirror parts in the third region by simple control.

The second driving source may have a second driving unit, the second driving unit may be configured in such a way that: when a control voltage of the second driving unit is larger than the voltage generated between the pair of driving electrodes, the distance between the pair of mirror parts decreases; and when the control voltage of the second driving unit is smaller than the voltage generated between the pair of driving electrodes, the distance between the pair of mirror parts increases, and the control unit may control the first driving source and the second driving source in such a way that the distance between the pair of mirror parts is changed by the second driving unit in the third region. In this case, it is possible to more suitably control the distance between the mirror parts in the third region.

The second driving unit may include an operational amplifier, and in the operational amplifier, an inverting input terminal may be connected to an output terminal, the output terminal may be connected to the Fabry-Perot interference filter, and the control voltage may be applied to a non-inverting input terminal. In this case, it is possible to more reliably and easily control the distance between the mirror parts in the third region.

The control device according to one aspect of the present disclosure may further comprise a voltage detection unit that detects the voltage generated between the pair of driving electrodes, wherein when the distance between the pair of mirror parts is changed by the first driving source, the control unit may feedback-control the first driving source based on a detection result of the voltage detection unit. In this case, it is possible to more reliably and easily control the distance between the mirror parts in the first region.

The control unit may switch use states of the first driving source and the second driving source from a state in which the distance between the pair of mirror parts is changed by the first driving source to a state in which the distance between the pair of mirror parts is changed by the second driving source based on a detection result of the voltage detection unit. In this case, the use states of the first driving source and the second driving source can be suitably switched from the state in which the distance between the mirror parts is changed by the first driving source to the state in which the distance between the mirror parts is changed by the second driving source.

The control unit may switch use states of the first driving source and the second driving source from a state in which the distance between the pair of mirror parts is changed by the second driving source to a state in which the distance between the pair of mirror parts is changed by the first driving source based on a control voltage of the second driving source. In this case, the use states of the first driving source and the second driving source can be suitably switched from the state in which the distance between the mirror parts is changed by the second driving source to the state in which the distance between the mirror parts is changed by the first driving source.

The control device according to one aspect of the present disclosure may further comprise: a current application unit that applies an alternating current having a frequency higher than a resonance frequency of the pair of mirror parts between the pair of driving electrodes; and a voltage detection unit that detects a voltage generated between the pair of driving electrodes during application of the alternating current, wherein the control unit may calculate electrostatic capacity between the pair of driving electrodes based on a detection result of the voltage detection unit. In this case, the distance between the mirror parts can be calculated based on the electrostatic capacity between the driving electrodes, and an actual distance between the mirror parts can be monitored during the operation of the Fabry-Perot interference filter.

The first driving source may be capable of sourcing and sinking a current. In this case, it is possible to more reliably and easily control the distance between the mirror parts in the first region.

An optical filter system according to one aspect of the present disclosure comprising: the above control device; and the Fabry-Perot interference filter controlled by the control device. In this optical filter system, it is possible to simplify the control while avoiding the pull-in phenomenon due to the above reason.

A control method according to one aspect of the present disclosure is a control method for controlling a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the control method comprising changing the distance between the pair of mirror parts by a first driving source in a first region and changing the distance between the pair of mirror parts by a second driving source in at least one part of an region other than the first region when an region including a maximum of the voltage in relation between the charges stored between the pair of driving electrodes, and the voltage between the pair of driving electrodes is defined as the first region, by using: the first driving source that is controlled by using a current as a control parameter, and changes the distance between the pair of mirror parts; and the second driving source that is controlled by using a voltage as a control parameter, and changes the distance between the pair of mirror parts.

In this control method, in the first region including the maximum of the voltage, the distance between the mirror parts is changed by the first driving source controlled by using the current as the parameter, and in at least the one part of the region other than the first region, the distance between the mirror parts is changed by the second driving source controlled by using the voltage as the control parameter. The pull-in phenomenon can be avoided by use of the first driving source in the first region. Furthermore, the second driving source is used in at least the one part of the region other than the first region, so that control can be simplified compared to a case in which the first driving source is used in the whole region, for example. This is because while the voltage generated between the mirror parts needs to be monitored to be feedback-controlled in a case of the first driving source controlled by using the current as the control parameter, feed-forward control can be performed in a case of the second driving source controlled by using the voltage as the control parameter. Therefore, according to this control device, it is possible to simplify the control while avoiding the pull-in phenomenon.

Advantageous Effects of Invention

According to one aspect of the present disclosure, it is possible to provide a control device, an optical filter system, and a control method capable of simplifying control while avoiding a pull-in phenomenon.

DESCRIPTION OF EMBODIMENTS

Hereinafter, an embodiment of the present disclosure will be described in detail with respect to the drawings. In the following description, the same or equivalent components are defined as the same reference numerals, and redundant description is omitted.

Figure 1:
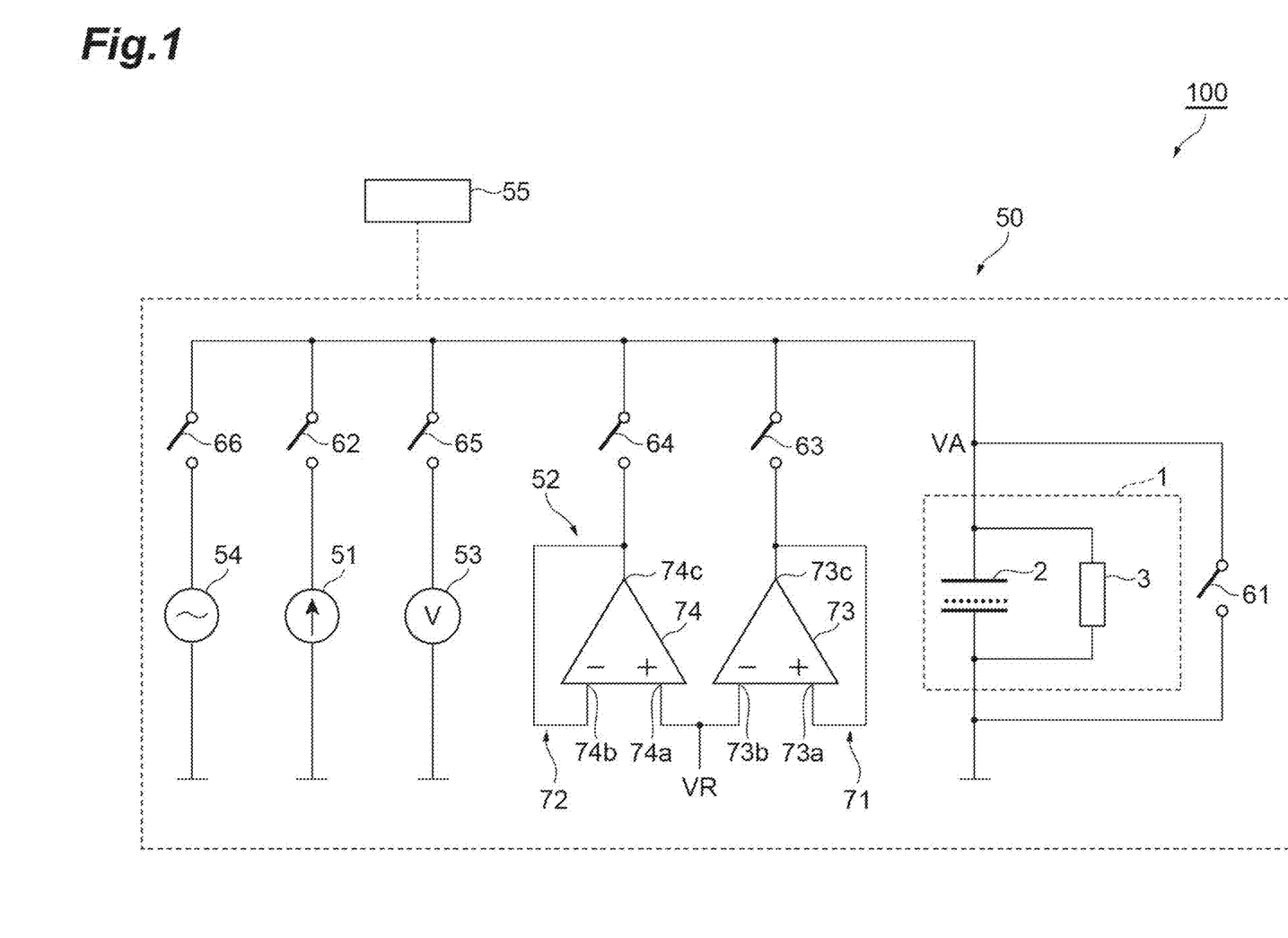
FIG. 1 is a configuration diagram of an optical filter system according to an embodiment.

As illustrated in FIG. 1, an optical filter system 100 comprises a Fabry-Perot interference filter 1, and a control device 50 controlling the Fabry-Perot interference filter 1.

[Constitution of Fabry-Perot Interference Filter]

Figure 2:
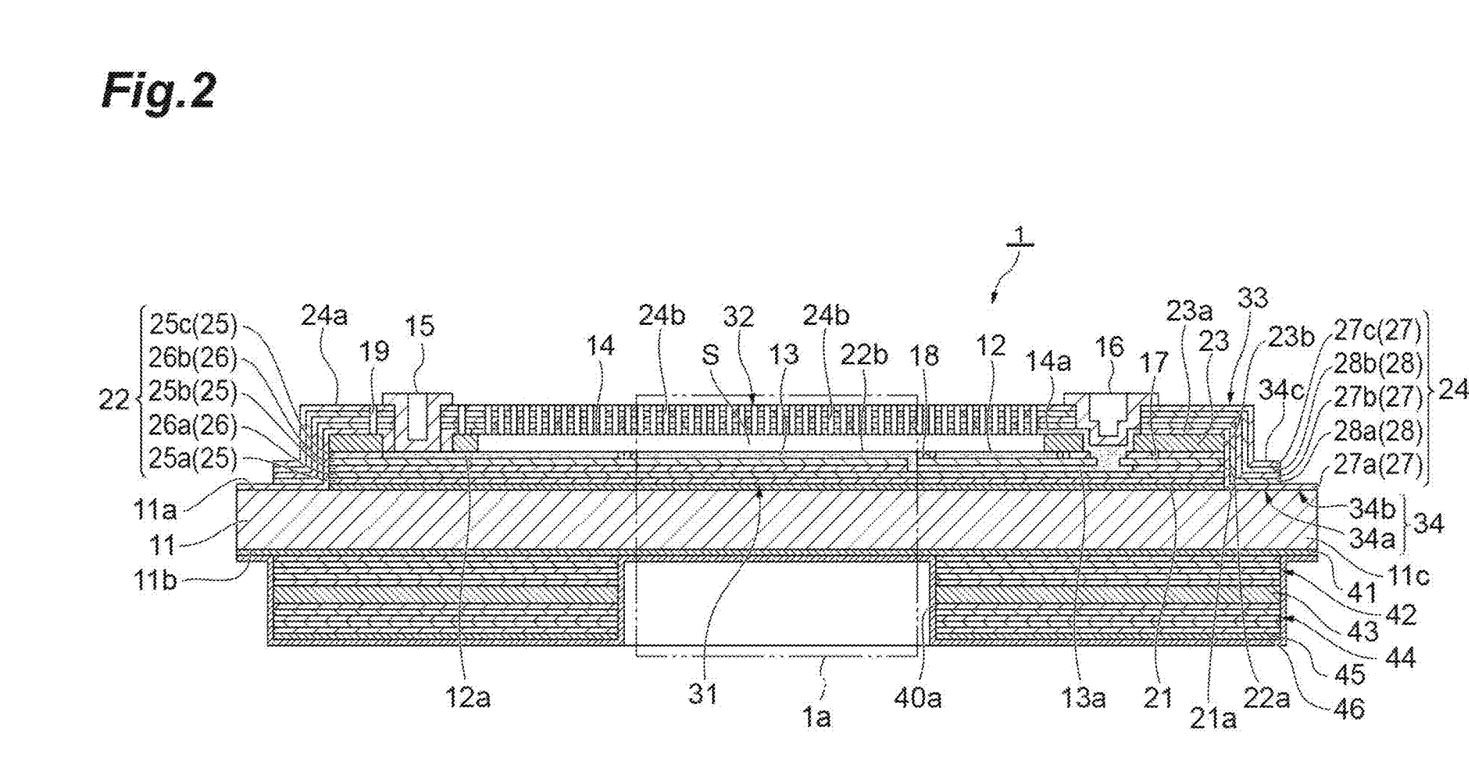
FIG. 2 is a sectional view of a Fabry-Perot interference filter.

As illustrated in FIG. 2, the Fabry-Perot interference filter 1 includes a substrate 11. The substrate 11 has a first surface 11a and a second surface 11b on a side opposite to the first surface 11a. On the first surface 11a, a reflection prevention layer 21, a first laminated body 22, an intermediate layer 23, and a second laminated body 24 are laminated in this order. Between the first laminated body 22 and the second laminated body 24, an air gap S is defined by the frame-shaped intermediate layer 23.

A shape and a positional relationship of each part when seen from a direction perpendicular to the first surface 11a (plan view) is as follows, for example. An outer edge of the substrate 11 has a rectangular shape. The outer edge of the substrate 11 and an outer edge of the second laminated body 24 are matched with each other. An outer edge of the reflection prevention layer 21, an outer edge of the first laminated body 22, and an outer edge of the intermediate layer 23 are matched with each other. The substrate 11 has an outer edge part 11c located on a side closer to an outer side than the outer edge of the intermediate layer 23 with respect to a center of the air gap. The outer edge part 11c has a framed shape and surrounds the intermediate layer 23 when seen from the direction perpendicular to the first surface 11a. The air gap S has a circular shape.

The Fabry-Perot interference filter 1 causes light having a predetermined wavelength to be transmitted in a light transmission area 1a defined on the center part. The light transmission area 1a is a columnar region, for example. The substrate 11 is formed of silicon, quartz or glass, for example. If the substrate 11 is formed of silicon, the reflection prevention layer 21 and the intermediate layer 23 are made of silicon dioxide, for example.

A portion (a portion overlapped with the air gap S on a plan view) corresponding to the light transmission area 1a in the first laminated body 22 functions as a first mirror part 31. The first mirror part 31 is a fixed mirror. The first mirror part 31 is disposed on the first surface 11a through the reflection prevention layer 21. The first laminated body 22 is constituted by alternately laminating a plurality of polysilicon layers 25 and a plurality of silicon nitride layers 26 one by one. In the Fabry-Perot interference filter 1, a polysilicon layer 25a, a silicon nitride layer 26a, a polysilicon layer 25b, a silicon nitride layer 26b, and a polysilicon layer 25c are laminated in this order on the reflection prevention layer 21. It is preferable that an optical thickness of each of the polysilicon layer 25 and the silicon nitride layer 26 constituting the first mirror part 31 is integer times of ¼ of a center transmission wavelength.

A portion (a portion overlapped with the air gap S on a plan view) corresponding to the light transmission area 1a in the second laminated body 24 functions as a second mirror part 32. The second mirror part 32 is a movable mirror. The second mirror part 32 faces the first mirror part 31 through the air gap S on a side opposite to the substrate 11 with respect to the first mirror part 31. A direction in which the first mirror part 31 and the second mirror part 32 face each other is in parallel with the direction perpendicular to the first surface 11a. The second laminated body 24 is disposed on the first surface 11a through the reflection prevention layer 21, the first laminated body 22, and the intermediate layer 23. The second laminated body 24 is constituted by alternately laminating a plurality of polysilicon layers 27 and a plurality of silicon nitride layers 28 one by one. In the Fabry-Perot interference filter 1, a polysilicon layer 27a, a silicon nitride layer 28a, a polysilicon layer 27b, a silicon nitride layer 28b, and a polysilicon layer 27c are laminated in this order on the intermediate layer 23. It is preferable that the optical thickness of each of the polysilicon layer 27 and the silicon nitride layer 28 constituting the second mirror part 32 is integer times of ¼ of the center transmission wavelength.

In a portion (a portion overlapped with the air gap S on a plan view) corresponding to the air gap S in the second laminated body 24, a plurality of through holes 24b are formed. These through holes reach the air gap S from a surface 24a on a side opposite to the intermediate layer 23 of the second laminated body 24. These through holes are formed to such a degree that does not substantially affect a function of the second mirror part 32. These through holes may be used for forming the air gap S by removing a part of the intermediate layer 23 by etching.

The second laminated body 24 further has a coating part 33 and a peripheral part 34 in addition to the second mirror part 32. The second mirror part 32, the coating part 33, and the peripheral part 34 are integrally formed to have a part of the same lamination structure as each other and to continue to each other. The coating part 33 surrounds the second mirror part 32 on a plan view. The coating part 33 covers a surface 23a on a side opposite to the substrate 11 and a side surface 23b of the intermediate layer 23, as well as a side surface 22a of the first laminated body 22, and a side surface 21a of the reflection prevention layer 21, and reaches the first surface 11a.

The peripheral part 34 surrounds the coating part 33 on a plan view. The peripheral part 34 is located on the first surface 11a in the outer edge part 11c. The outer edge of the peripheral part 34 is matched with the outer edge of the substrate 11 on a plan view. The peripheral part 34 is thinned along the outer edge of the outer edge part 11c. In this example, the peripheral part 34 is thinned by removal of a part of the polysilicon layer 27 and the silicon nitride layer 28 constituting the second laminated body 24. The peripheral part 34 has a non-thinned part 34a continuing to the coating part 33 and a thinned part 34b surrounding the non-thinned part 34a. In the thinned part 34b, the polysilicon layer 27 and the silicon nitride layer 28 are removed other than the polysilicon layer 27a provided directly on the first surface 11a.

On the first mirror part 31, a first driving electrode 12 formed by surrounding the light transmission area 1a on a plan view and a compensation electrode 13 formed by overlapping the light transmission area 1a on a plan view are provided. That is, in this example, the first driving electrode 12 and the compensation electrode 13 constitute the first mirror part 31 (the first mirror part 31, the first driving electrode 12, and the compensation electrode 13 are formed integrally each other). A size of the compensation electrode 13 is a size including the entire light transmission area 1a but may be substantially the same as the size of the light transmission area 1a. The first driving electrode 12 and the compensation electrode 13 are formed by lowering resistance of the polysilicon layer 25c by doping impurities. On the second mirror part 32, a second driving electrode 14 facing the first driving electrode 12 and the compensation electrode 13 is formed through the air gap S. That is, in this example, the second driving electrode 14 constitutes the second mirror part 32 (the second 32 and the second driving electrode 14 are formed integrally each other). The second driving electrode 14 is formed by lowering resistance of the polysilicon layer 27a by doping impurities.

The Fabry-Perot interference filter 1 further comprises a pair of terminals 15 and a pair of terminals 16. The pair of terminals 15 is provided by facing each other while sandwiching the light transmission area 1a. Each of the terminals 15 is disposed in the through hole from the surface 24a of the second laminated body 24 to the first laminated body 22. Each of the terminals 15 is electrically connected to the first driving electrode 12 through a wiring 12a. The terminal 15 is formed by a metal film of aluminum or an alloy thereof, for example.

The pair of terminals 16 is provided by facing each other while sandwiching the light transmission area 1a. Each of the terminals 16 is disposed in the through hole from the surface 24a of the second laminated body 24 to the first laminated body 22. Each of the terminals 16 is electrically connected to the compensation electrode 13 through a wiring 13a and is electrically connected to the second driving electrode 14 through a wiring 14a. The terminal 16 is formed of a metal film of aluminum or an alloy thereof, for example. The direction in which the pair of terminals 15 face each other is orthogonal to the direction in which the pair of terminals 16 face each other.

On a surface 22b of the first laminated body 22, trenches 17 and 18 are provided. The trench 17 extends annularly by surrounding a connection portion with the terminal 16 in the wiring 13a. The trench 17 electrically insulates the first driving electrode 12 and the wiring 13a. The trench 18 extends annularly along an inner edge of the first driving electrode 12. The trench 18 electrically insulates the first driving electrode 12 and an area (the compensation electrode 13) on an inner side of the first driving electrode 12. An area in each of the trenches 17 and 18 may be an insulating material or an air gap. On the surface 24a of the second laminated body 24, a trench 19 is provided. The trench 19 extends annularly by surrounding the terminal 15. The trench 19 electrically insulates the terminal 15 and the second driving electrode 14. An area in the trench 19 may be an insulating material or may be an air gap.

On the second surface 11b of the substrate 11, a reflection prevention layer 41, a third laminated body 42, an intermediate layer 43, and a fourth laminated body 44 are laminated in this order. The reflection prevention layer 41 and the intermediate layer 43 have constitution similar to that of the reflection prevention layer 21 and the intermediate layer 23. The third laminated body 42 and the fourth laminated body 44 have a lamination structure symmetric to the first laminated body 22 and the second laminated body 24 based on the substrate 11, respectively. The reflection prevention layer 41, the third laminated body 42, the intermediate layer 43, and the fourth laminated body 44 have a function of suppressing warping of the substrate 11.

In the third laminated body 42, the intermediate layer 43, and the fourth laminated body 44, an opening 40a is provided to overlap the light transmission area 1a on a plan view. The opening 40a has a diameter substantially the same as the size of the light transmission area 1a. The opening 40a is opened on a light outgoing side. A bottom surface of the opening 40a reaches the reflection prevention layer 41.

On a surface on the light outgoing side of the fourth laminated body 44, a light shielding layer 45 is formed. The light shielding layer 45 is made of a metal film of aluminum or an alloy thereof, for example. On the surface of the light shielding layer 45 and on an inner surface of the opening 40a, a protective layer 46 is formed. The protective layer 46 covers outer edges of the third laminated body 42, the intermediate layer 43, the fourth laminated body 44, and the light shielding layer 45 and covers the reflection prevention layer 41 on the outer edge part 11c. The protective layer 46 is made of aluminum oxide, for example.

[Configuration of Control Device]

As illustrated in FIG. 1, the control device 50 comprises a first driving source 51, a second driving source 52, a voltage detection unit 53, a current application unit (alternating small-signal current application unit) 54, a control unit 55, and switches 61 to 66. In FIG. 1, the Fabry-Perot interference filter 1 is illustrated as an equivalent circuit. The Fabry-Perot interference filter 1 as the equivalent circuit can be expressed by a variable capacitor 2, and a resistor 3 connected in parallel to the variable capacitor 2. The variable capacitor 2 is equivalent to the electrostatic capacitance represented by the first mirror part 31 and the second mirror part 32. The Fabry-Perot interference filter 1 is connected in parallel to an openable switch 61.

The control device 50 controls a distance between the first mirror part 31 and the second mirror part 32 (hereinafter, also referred to as an "inter-mirror distance") mechanically restrained by a spring in the Fabry-Perot interference filter 1. The control device 50 comprises the first driving source 51 and the second driving source 52 as driving sources for changing the inter-mirror distance, and switches the driving source between the first driving source 51 and the second driving source 52 to adjust the inter-mirror distance.

Each of the first driving source 51 and the second driving source 52 adjusts the amount of electric charge stored between the first driving electrode 12 and the second driving electrode 14 (that is, between the first mirror part 31 and the second mirror part 32) through the terminals 15, 16 (details will be described below). As a result, an electrostatic force in accordance with the charges is generated between the first driving electrode 12 and the second driving electrode 14. The second mirror part 32 is attracted to the first mirror part 31 fixed to the substrate 11 by the electrostatic force, and the inter-mirror distance is adjusted. Thus, in the Fabry-Perot interference filter 1, the inter-mirror distance changes in accordance with the charges stored between the first mirror part 31 and the second mirror part 32.

The wavelength of light transmitted through the Fabry-Perot interference filter 1 depends on the inter-mirror distance in the light transmission area 1a. Accordingly, the charges stored between the first driving electrode 12 and the second driving electrode 14 is adjusted, so that it is possible to appropriately select the wavelength of the light transmitted through the Fabry-Perot interference filter. The potential of the compensation electrode 13 is the same as the potential of the second driving electrode 14. Accordingly, the compensation electrode 13 functions in such a way as to keep the first mirror part 31 and the second mirror part 32 flat in the light transmission area 1a.

In the Fabry-Perot interference filter 1, for example, while the charges stored between the first driving electrode 12 and the second driving electrode 14 are changed (that is, while the inter-mirror distance is changed), the light transmitted in the light transmission area 1a of the Fabry-Perot interference filter 1 is detected by a photodetector, so that it is possible to obtain an optical spectrum.

The first driving source 51 is connected to the Fabry-Perot interference filter 1 through an openable switch 62. The first driving source 51 applies a direct current between the first mirror part 31 and the second mirror part 32. The first driving source 51 is, for example, a bipolar current source capable of supplying and absorbing a current. The first driving source 51 may be composed of, for example, an electronic circuit called a Howland current pump. Alternatively, the first driving source 51 may be composed of an electronic circuit capable of transferring a charging packet. Such an electronic circuit is described in, for example, U.S. Pat. No. 5,969,513 "Switched capacitor current source for use in switching regulators". The switched capacitor current source can be very efficiently implemented as an integrated circuit by utilizing a standard semiconductor technology (for example, refer to B. Robert Gregoire and Un-Ku Moon, in IEEE Transactions Circuit and Systems II: Express Briefs, Vol. 54, No. 3, March 2007, "A Sub 1-V Constant Gm-C Switched-Capacitor Current Source").

The first driving source 51 is controlled by using a current applied between the first mirror part 31 and the second mirror part 32 by supply or absorption by the first driving source 51 as a control parameter (instruction parameter), by the control unit 55. That is, the control unit 55 controls a current amount applied between the first mirror part 31 and the second mirror part 32, in a case where the inter-mirror distance is changed by the first driving source 51.

The second driving source 52 has a first driving unit 71 and a second driving unit 72. The first driving unit 71 includes an operational amplifier 73. The operational amplifier 73 has a non-inverting input terminal 73a, an inverting input terminal 73b, and an output terminal 73c. The non-inverting input terminal 73a is connected to the output terminal 73c, and the output terminal 73c is connected to the Fabry-Perot interference filter 1 through an openable switch 63, and a DC control voltage VR is applied to the inverting input terminal 73b.

In a case where the switch 63 is closed, and the first driving unit 71 is electrically connected to the Fabry-Perot interference filter 1, a voltage VA generated between the first mirror part 31 and the second mirror part 32 increases when the control voltage VR is larger than the voltage VA, and the voltage VA decreases when the control voltage VR is smaller than the voltage VA. More specifically, when the control voltage VR is larger than the voltage VA, a current flows from the Fabry-Perot interference filter 1 toward the first driving unit 71 (sink current), charges stored between the first mirror part 31 and the second mirror part 32 decreases. When the control voltage VR is smaller than the voltage VA, a current flows from the first driving unit 71 toward the Fabry-Perot interference filter 1, charges stored between the first mirror part 31 and the second mirror part 32 increases. As described below, the first driving unit 71 is used in a second region R2 in which the voltage VA increases with decrease of the charges, and the voltage VA decreases with increase of the charges. As a result, the voltage VA becomes equal to the control voltage VR. That is, the first driving unit 71 functions as a voltage stabilizer for guaranteeing that the voltage VA is equal to the control voltage VR in the second region R2 above the pull-in voltage.

The second driving unit 72 includes an operational amplifier 74. The operational amplifier 74 has a non-inverting input terminal 74a, an inverting input terminal 74b, and an output terminal 74c. The inverting input terminal 74b is connected to the output terminal 74c, and the output terminal 74c is connected to the Fabry-Perot interference filter 1 through an openable switch 64, and the control voltage VR is applied to the non-inverting input terminal 74a.

In a case where the switch 64 is closed, and the second driving unit 72 is electrically connected to the Fabry-Perot interference filter 1, the voltage VA increases when the control voltage VR is larger than the voltage VA, and the voltage VA decreases when the control voltage VR is smaller than the voltage VA. More specifically, when the control voltage VR is larger than the voltage VA, the current flows from the first driving unit 71 toward the Fabry-Perot interference filter 1 (sourcing current), charges stored between the first mirror part 31 and the second mirror part 32 increases. When the control voltage VR is smaller than the voltage VA, the current flows from the Fabry-Perot interference filter 1 to the first driving unit 71 (sinking current), the charges stored between the first mirror part 31 and the second mirror part 32 decreases. As described below, the second driving unit 72 is used in a second region R3 in which the voltage VA increases with increase of the charges, and the voltage VA decreases with decrease of the charges. As a result, the voltage VA becomes equal to the control voltage VR. That is, the second driving unit 72 also functions as a voltage stabilizer for guaranteeing that the voltage VA is equal to the control voltage VR in the region R3 below the pull-in voltage.

Each of the first driving unit 71 and the second driving unit 72 is controlled by using the control voltage VR as a control parameter (instruction parameter) by the control unit 55. That is, the control unit 55 controls the magnitude of the control voltage VR when the inter-mirror distance is changed by the first driving unit 71 or the second driving unit 72. As described above, in the first driving unit 71 and the second driving unit 72, the control voltage VR becomes equal to the voltage VA, and therefore it can be regarded that each of the first driving unit 71 and the second driving unit 72 is controlled by using the voltage VA generated between the first mirror part 31 and the second mirror part 32 as a control parameter.

The voltage detection unit 53 is, for example, a voltmeter. The voltage detection unit 53 is connected to the Fabry-Perot interference filter 1 through an openable switch 65, and detects the voltage VA generated between the first mirror part 31 and the second mirror part 32. The current application unit 54 is connected in parallel to the Fabry-Perot interference filter 1. The current application unit 54 applies an alternating current having a frequency higher than the resonance frequency of the first mirror part 31 and the second mirror part 32 between the first mirror part 31 and the second mirror part 32. The frequency of the alternating current is set higher than ten times the resonance frequency of the mechanically spring-loaded the first mirror part 31 and the second mirror part 32, for example. Details of the current application unit 54 will be described below. The control unit 55 is composed of, for example, a computer including a processor (CPU), and a RAM and a ROM being storage media. The control unit 55 controls operation of each unit of the control device 50.

[Control Method of Fabry-Perot Interference Filter]

Figure 3:
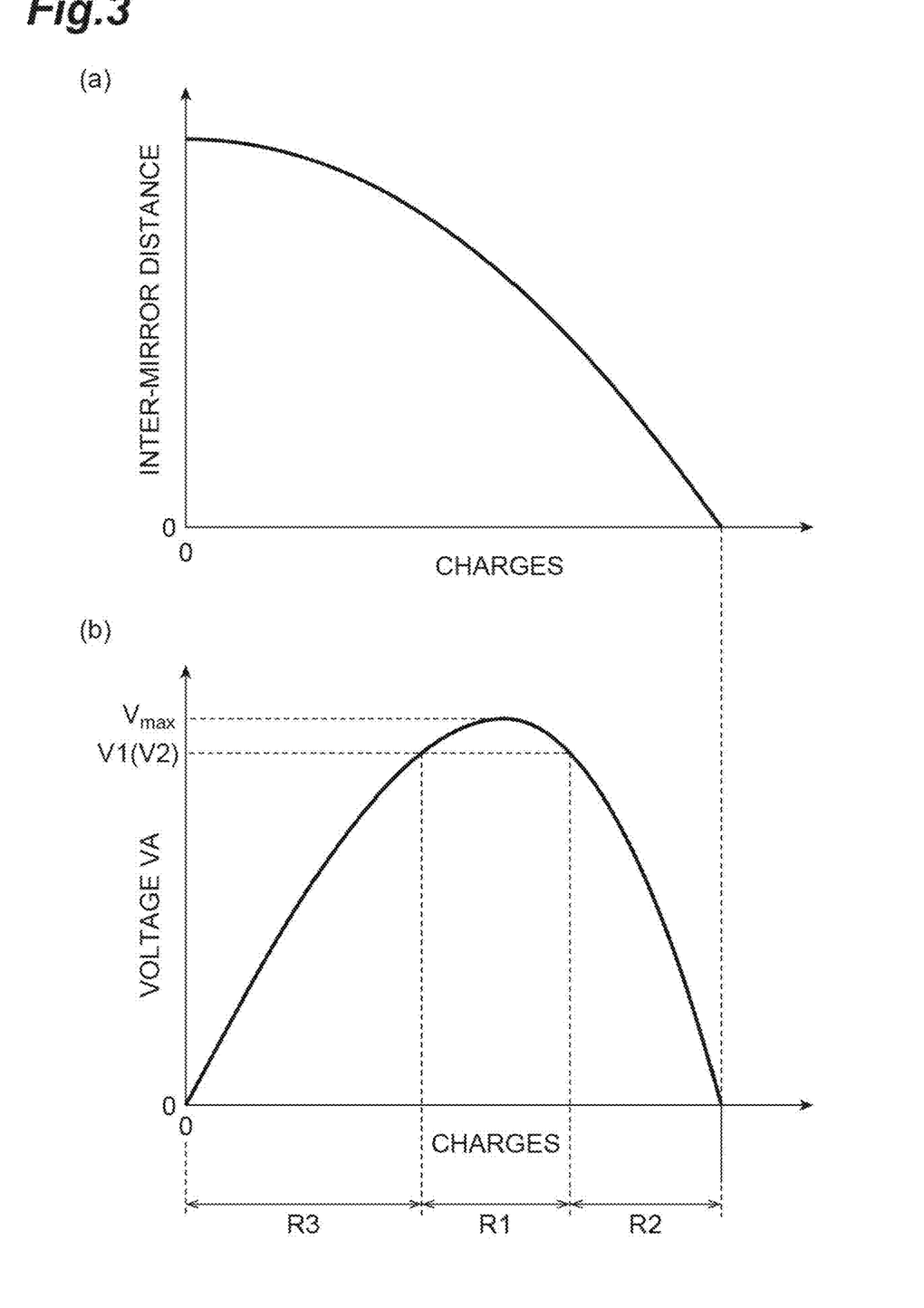
FIG. 3(a) is a graph illustrating relation between charges stored between a first mirror part and a second mirror part, and a distance between the first mirror part and the second mirror part.
FIG. 3(b) is a graph illustrating relation between charges stored between the first mirror part and the second mirror part, and a voltage between the first mirror part and the second mirror part.

A method for controlling the inter-mirror distance in the Fabry-Perot interference filter 1 will be described. FIG. 3(a) is a graph illustrating relation between the charges stored between the first mirror part 31 and the second mirror part 32, and the inter-mirror distance, and FIG. 3(b) is a graph illustrating relation between the charges stored between the first mirror part 31 and the second mirror part 32 (that is, between the first driving electrode 12 and the second driving electrode 14), and the voltage VA between the first mirror part 31 and the second mirror part 32 (that is, between the first driving electrode 12 and the second driving electrode 14). Hereinafter, in the relations, with respect to the charges (that is, in the abscissa in the graph of FIG. 3(b)), an region (operational region) including a maximum (maximum value Vmax, peak) of the voltage VA is defined as a first region R1, an region in which charges are larger than the charges in the first region R1 is defined as the second region R2, an region in which charges are smaller than the first region R1 is defined as the third region R3. In the control method of this embodiment, the inter-mirror distance is adjusted by using the first driving source 51 in the first region R1, the inter-mirror distance is adjusted by using the first driving unit 71 of the second driving source 52 in the second region R2, and the inter-mirror distance is adjusted by using the second driving unit 72 of the second driving source 52 in the third region R3.

As an example, control for adjusting the inter-mirror distance to a predetermined target distance included in the second region R2 will be described. At the time of starting control, for example, the switches 61 to 66 are opened. First, the control unit 55 closes the switch 61. As a result, the charge difference stored between the first mirror part 31 and the second mirror part 32 becomes zero, and the first mirror part 31 and the second mirror part 32 are placed at a mechanical equilibrium position. At this time, the charges stored between the first mirror part 31 and the second mirror part 32 are included in the third region R3. Then, the control unit 55 closes the switch 64, so that the second driving unit 72 is connected to the Fabry-Perot interference filter 1.

In the third region R3, the control unit 55 increases the control voltage VR applied to the second driving unit 72 to increase the charges stored between the first mirror part 31 and the second mirror part 32, so that the inter-mirror distance is decreased.

Then, when the control voltage VR becomes a predetermined voltage V1 (that is, when the voltage VA, which is equal to the control voltage VR by the second driving source 52 as the voltage stabilizer, becomes the predetermined voltage V1 or more), the control unit 55 opens the switch 64 to separate the second driving unit 72 from the Fabry-Perot interference filter 1, and closes the switches 62, 65 to connect the first driving source 51 and the voltage detection unit 53 to the Fabry-Perot interference filter 1. The case in which the voltage VA becomes the voltage V1 or more can be translated into a case of changing from a state in which the charges stored between the first mirror part 31 and the second mirror part 32 are included in the third region R3 to a state in which the charges are included in the first region R1. Thus, the control unit 55 switches the use states of the first driving source 51 and the second driving source 52 from a state in which the inter-mirror distance is changed by the second driving unit 72 to a state in which the inter-mirror distance is changed by the first driving source 51 based on the control voltage VR. The voltage V1 is a value corresponding to a boundary between the first region R1 and the third region R3, for example. The voltage V1 is set to a value of about ½ the maximum value Vmax to about Vmax−0.5 V, for example.

In the first region R1, the control unit 55 causes the first driving source 51 to supply a current to increase a current applied between the first mirror part 31 and the second mirror part 32, and increases the charges stored between the first mirror part 31 and the second mirror part 32, so that the inter-mirror distance is decreased. At this time, the voltage VA first increases and then decreases. At this time, the control unit 55 feedback-controls the first driving source 51 based on the voltage VA detected by the voltage detection unit 53. The control unit 55 feedback-controls the current supplied between the first mirror part 31 and the second mirror part 32 in such a way that the voltage VA approaches a target value of a voltage corresponding to a desired inter-mirror distance, for example. This is because current leakage may occur between the first mirror part 31 and the second mirror part 32. As a result, even when leakage occurs, control based on an actual voltage VA in the graph of FIG. 3(b) can be performed.

Then, when the voltage VA detected by the voltage detection unit 53 becomes a predetermined voltage V2 or less, the control unit 55 opens the switch 62, 65 to separate the first driving source 51 and the voltage detection unit 53 from the Fabry-Perot interference filter 1, and closes the switch 63 to connect the first driving unit 71 to the Fabry-Perot interference filter 1. The case in which the voltage VA becomes the voltage V2 or less can be translated into a case of changing from a state in which the charges stored between the first mirror part 31 and the second mirror part 32 are included in the first region R1 to a state in which the charges are included in the second region R2. Thus, the control unit 55 switches the use states of the first driving source 51 and the second driving source 52 from a state in which the inter-mirror distance is changed by the first driving source 51 to a state in which the inter-mirror distance is changed by the first driving unit 71 based on a detection result of the voltage detection unit 53. A voltage V2 is a value corresponding to a boundary between the first region R1 and the second region R2, for example. Although the voltage V2 is equal to the voltage V1 in this example, the voltage V2 may be set to a value different from the voltage V1. The voltage V2 is set to a value of about ½ the maximum value Vmax to about Vmax−0.5 V, for example.

In the second region R2, the control unit 55 decreases the control voltage VR applied to the first driving unit 71 to increase the charges stored between the first mirror part 31 and the second mirror part 32, so that the inter-mirror distance is decreased up to the target distance. As a result, the inter-mirror distance is adjusted to the target distance.

As another example, control for adjusting the inter-mirror distance from the above target distance to another target distance including the third region R3 will be described. At the time of starting control, the charges stored between the first mirror part 31 and the second mirror part 32 are included in the second region R2. In the second region R2, the control unit 55 increases the control voltage VR applied to the first driving unit 71 to decrease the charges stored between the first mirror part 31 and the second mirror part 32, so that the inter-mirror distance is increased.

Then, when the control voltage VR becomes the predetermined voltage V2 or more (that is, when the voltage VA, which is equal to the control voltage VR by the second driving source 52 as the voltage stabilizer, becomes the predetermined voltage V2 or more), the control unit 55 opens the switch 63 to separate the first driving unit 71 from the Fabry-Perot interference filter 1, and closes the switches 62, 65 to connect the first driving source 51 and the voltage detection unit 53 to the Fabry-Perot interference filter 1. Thus, the control unit 55 switches the use states (operational state) of the first driving source 51 and the second driving source 52 from a state in which the inter-mirror distance is changed by the first driving unit 71 to a state in which the inter-mirror distance is changed by the first driving source 51, based on the control voltage VR.

In the first region R1, the control unit 55 causes the first driving source 51 to sink a current first to increase then to decrease the voltage applied between the first mirror part 31 and the second mirror part 32, and decreases the charges stored between the first mirror part 31 and the second mirror part 32, so that the inter-mirror distance is increased. At this time, the voltage VA first increases and then decreases. At this time, the control unit 55 feedback-controls the first driving source 51 based on the voltage VA detected by the voltage detection unit 53. The control unit 55 feedback-controls the current applied between the first mirror part 31 and the second mirror part 32 in such a way that the voltage VA approaches a target value of a voltage corresponding to a desired inter-mirror distance, for example.

Then, when the voltage VA detected by the voltage detection unit 53 becomes the voltage V1 or less, the control unit 55 opens the switch 62, 65 to separate the first driving source 51 and the voltage detection unit 53 from the Fabry-Perot interference filter 1, and closes the switch 64 to connect the second driving unit 72 to the Fabry-Perot interference filter 1. Thus, the control unit 55 switches the use states of the first driving source 51 and the second driving source 52 from a state in which the inter-mirror distance is changed by the first driving source 51 to a state in which the inter-mirror distance is changed by the second driving unit 72 based on a detection result of the voltage detection unit 53.

In the third region R3, the control unit 55 decreases the control voltage VR applied to the second driving unit 72 to decrease the charges stored between the first mirror part 31 and the second mirror part 32, so that the inter-mirror distance is increased up to the target distance. As a result, the inter-mirror distance is adjusted to the target distance.

[Monitoring Method of Distance Between Mirrors]

A monitoring method of an inter-mirror distance implemented by the Fabry-Perot interference filter 1 will be described. This monitoring method is implemented in a state in which the inter-mirror distance is adjusted to a predetermined distance, for example. At the time of monitoring start, the switches 65, 66 are closed, and the voltage detection unit 53 and the current application unit 54 are connected to the Fabry-Perot interference filter 1. The current application unit 54 applies an alternating current having a frequency higher than the resonance frequency of the first mirror part 31 and the second mirror part 32 between the first driving electrode 12 and the second driving electrode 14 (that is, between the first mirror part 31 and the second mirror part 32) through the terminals 15, 16. During application of the alternating current by the current application unit 54, an AC voltage is generated between the first mirror part 31 and the second mirror part 32. This AC voltage is detected by the voltage detection unit 53.

The control unit 55 calculates the electrostatic capacity between the first mirror part 31 and the second mirror part 32 based on the AC voltage detected by the voltage detection unit 53. This electrostatic capacity can be calculated based on an alternating current applied between the first mirror part 31 and the second mirror part 32, an AC voltage generated between the first mirror part 31 and the second mirror part 32, and the known frequency of the alternating current and the AC voltage. More specifically, by using an alternating current I(t), and an AC voltage V(t), complex impedance Z (ω) as a function of an angular frequency ω is obtained by $Z(\omega)=V(\omega)/I(\omega)$, and electrostatic capacity C is obtained by $C=(\omega \times |Z(\omega)|)^{-1}$. The control unit 55 calculates the distance between the first mirror part 31 and the second mirror part 32 based on the obtained electrostatic capacity. As a result, during operation of the Fabry-Perot interference filter 1, it is possible to accurately monitor an actual distance between the first mirror part 31 and the second mirror part 32.

Function and Effect

As described above, in the control device 50, in the first region R1 including the maximum of the voltage VA, the inter-mirror distance is changed by the first driving source 51 controlled by using a current applied between the first mirror part 31 and the second mirror part 32 as a parameter, and in the second region R2 and the third region R3 other than the first region R1, the inter-mirror distance is changed by the second driving source 52 (the first driving unit 71 and the second driving unit 72) controlled by using the control voltage VR as a control parameter. A pull-in phenomenon can be avoided by use of the first driving source 51 in the first region R1. Hereinafter, this point will be described with reference to FIG. 3(a) and FIG. 3(b).

Unlike the control method of this embodiment, when the inter-mirror distance is tried to be adjust with the control voltage VR as the control parameter in whole region with respect to charges, the control voltage VR becomes larger than the maximum value Vmax and there is a concern that the above described pull-in phenomenon occurs. In the pull-in phenomenon, the first mirror part 31 and the second mirror part 32 apply attractive force to each other, overcoming the restraining force of the mechanical spring, so that the first mirror part 31 and the second mirror part 32 firmly come into mechanical contact with each other, so that there is a concern that failure occurs in the Fabry-Perot interference filter 1. On the other hand, according to the control method of this embodiment, the first driving source 51 is used in the first region R1, so that it is possible to avoid the pull-in phenomenon, and it is possible to enhance reliability.

When the inter-mirror distance is tried to be adjusted with the control voltage VR as the control parameter in the whole region with respect to charges, a range in which the control voltage VR can be changed is only a left region with respect to the maximum value Vmax in the graph illustrated in FIG. 3(b). Therefore, the inter-mirror distance can be changed only in a narrow range (for example, about ⅔ of initial displacement). On the other hand, according to the control method of this embodiment, the inter-mirror distance can be changed in a wide range (full range) without such restriction.

Furthermore, in the second region R2 and the third region R3 other than the first region R1, the second driving source 52 (first driving unit 71 and the second driving unit 72) is used, thereby control can be simplified compared to a case in which the first driving source 51 is used in the whole region, for example. This is because while the voltage VA generated between the first mirror part 31 and the second mirror part 32 (that is, between the first driving electrode 12 and the second driving electrode 14) needs to be monitored to be feedback-controlled in a case of the first driving source 51 controlled by using a current as the control parameter, feed-forward control can be performed in a case of the second driving source 52 controlled by using the control voltage VR as the control parameter, such that leakage current contributions cannot influence the inter mirror distance. That is, current leakage may occur between the first mirror part 31 and the second mirror part 32, for example, and therefore a current needs to be successively feedback-controlled in such a way that the voltage VA approaches the target value of the voltage corresponding to the desired inter-mirror distance, in a case of the first driving source 51. On the other hand, in the second driving source 52, the feed-forward control can be used, and therefore the desired inter-mirror distance can be promptly adjusted by simple control with a small amount of calculation. As described above, according to the control device 50, it is possible to simplify the control while avoiding the pull-in phenomenon.

In the control device 50, the control unit 55 controls the first driving source 51 and the second driving source 52 in such a way that the inter-mirror distance is changed by the second driving source 52 in the second region R2. As a result, the inter-mirror distance can be controlled in the second region R2 by simple voltage control. Furthermore, the second driving source 52 is used in the second region R2, so that it is possible to improve control accuracy of the inter-mirror distance in the second region R2. That is, as the inter-mirror distance decreases, current leakage is likely to occur between the first mirror part 31 and the second mirror part 32, and therefore charges are unlikely to be stored in the second region R2 compared to other regions. Therefore, it is difficult to adjust the inter-mirror distance to a desired distance by using the first driving source 51 in the second region R2. In contrast, in the control device 50, control accuracy of the inter-mirror distance in the second region R2 can be improved by using the second driving source 52 in the second region R2.

In the control device 50, the first driving unit 71 is configured in such a way that the inter-mirror distance increases when the control voltage VR is larger than the voltage VA, and the inter-mirror distance decreases when the control voltage VR is smaller than the voltage VA. The control unit 55 controls the first driving source 51 and the second driving source 52 in such a way that the inter-mirror distance is changed by the first driving unit 71 in the second region R2. As a result, it is possible to more simply and reliably control the inter-mirror distance in the second region R2. The voltage stabilizer like the first driving unit 71 is used, so that it is guaranteed that the control voltage VR and the voltage VA almost coincide regardless of the presence or absence of a leakage current, and therefore it is possible to perform accurate and stable control based on an actual state of the Fabry-Perot interference filter 1.

In the control device 50, the first driving unit 71 includes the operational amplifier 73, and in the operational amplifier 73, the non-inverting input terminal 73a is connected to the output terminal 73c, the output terminal 73c is connected to the Fabry-Perot interference filter 1, and the control voltage VR is applied to the inverting input terminal 73b. As a result, it is possible to more simply and reliably control the inter-mirror distance in the second region R2.

In the control device 50, the control unit 55 controls the first driving source 51 and the second driving source 52 in such a way that the inter-mirror distance is changed by the second driving source 52 in the third region R3. As a result, in the third region R3, the inter-mirror distance can be controlled by simple voltage control. Furthermore, in the control device 50, the control unit 55 controls the first driving source 51 and the second driving source 52 in such a way that the inter-mirror distance is changed by the first driving source 51 in the first region R1, and causes the second driving source 52 to change the inter-mirror distance in the second region R2 and the third region R3. In this case, it is only necessary to monitor a voltage in the first region R1 where feedback-control is necessary, and voltages are not necessarily monitored in the second region R2 and the third region R3, and therefore a wide detection range is not required to a voltage monitor. As a result, it is possible to improve a degree of selection freedom of a monitor, and it is possible to reduce in cost and increase in speed.

In the control device 50, the second driving unit 72 is configured in such a way that the inter-mirror distance decreases when the control voltage VR is larger than the voltage VA, and the inter-mirror distance increases when the control voltage VR is smaller than the voltage VA. The control unit 55 controls the first driving source 51 and the second driving source 52 in such a way that the inter-mirror distance is changed by the second driving unit 72 in the third region R3. As a result, it is possible to more simply and reliably control the inter-mirror distance in the third region R3.

In the control device 50, the second driving unit 72 includes the operational amplifier 74, and in the operational amplifier 74, the inverting input terminal 74b is connected to the output terminal 74c, the output terminal 74c is connected to the Fabry-Perot interference filter 1, and the control voltage VR is applied to the non-inverting input terminal 74a. As a result, it is possible to more simply and reliably control the inter-mirror distance in the third region R3.

In the control device 50, the control unit 55 feedback-controls the first driving source 51 based on the detection result of the voltage detection unit 53, when the inter-mirror distance is changed by the first driving source 51. As a result, it is possible to more simply control the inter-mirror distance in the first region R1.

In the control device 50, the control unit 55 switches the use states of the first driving source 51 and the second driving source 52 from a state in which the inter-mirror distance is changed by the first driving source 51 to a state in which the inter-mirror distance is changed by the second driving source 52 based on the voltage detection unit 53. As a result, the use states of the first driving source 51 and the second driving source 52 can be suitably switched from a state in which the inter-mirror distance is changed by the first driving source 51 to a state in which the inter-mirror distance is changed by second driving source 52.

In the control device 50, the control unit 55 may switch the use states of the first driving source 51 and the second driving source 52 from the state in which the inter-mirror distance is changed by the second driving source 52 to the state in which the inter-mirror distance is changed by the first driving source 51 based on the control voltage of the second driving source 52. In this case, the use states of the first driving source 51 and the second driving source 52 can be suitably switched from the state in which the inter-mirror distance is changed by the second driving source 52 to the state in which the inter-mirror distance is changed by the first driving source 51.

The control device 50 comprises the current application unit 54 (small-signal AC current source) for applying an alternating current having a frequency higher than the resonance frequency of the first mirror part 31 and the mechanically spring-loaded second mirror part 32 between the first mirror part 31 and the second mirror part 32. The control unit 55 calculates electrostatic capacity between the first mirror part 31 and the second mirror part 32 based on the detection result of the voltage detection unit 53. As a result, the inter-mirror distance can be calculated based on the electrostatic capacity between the first mirror part 31 and the second mirror part 32, and the actual inter-mirror distance can be monitored during the operation of the Fabry-Perot interference filter 1. In the control device 50, the first driving source 51 can supply and sink a current. As a result, it is possible to more suitably control the inter-mirror distance in the first region R1.

[Modification]

The present disclosure is not limited to the above embodiment. For example, the optical filter system 100 may be configured like an optical filter system 100A of a first modification illustrated in FIG. 4. In the first modification, a second driving source 52 has an operational amplifier 75 in place of the operational amplifier 73, 74. The operational amplifier 75 has a non-inverting input terminal 75a, an inverting input terminal 75b, and an output terminal 75c. The non-inverting input terminal 75a is connected to the output terminal 75c through an openable switch 81. The inverting input terminal 75b is connected to the output terminal 75c through an openable switch 82. The output terminal 75c is connected to the Fabry-Perot interference filter 1 through an openable switch 67. The non-inverting input terminal 75a is connected to an application unit of the control voltage VR through an openable switch 83. The inverting input terminal 75b is connected to the application unit of the control voltage VR through an openable switch 84. The control voltage VR is applied to the non-inverting input terminal 75a when the switch 83 is closed. The control voltage VR is applied to the inverting input terminal 75b when the switch 84 is closed.

Figure 4:
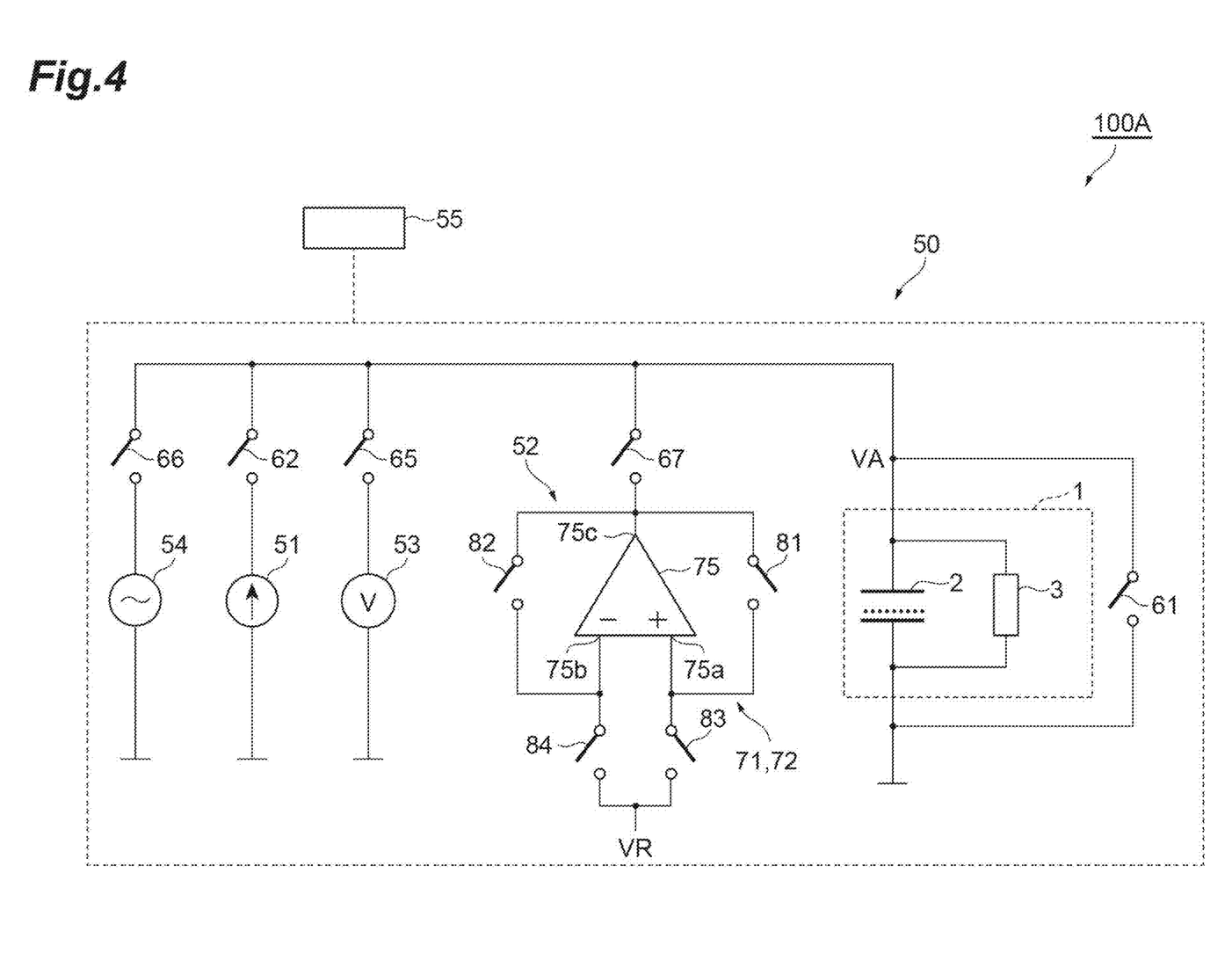
FIG. 4 is a configuration diagram of an optical filter system according to a first modification.

In the second driving source 52, when the switches 81, 84 are closed, and the switches 82, 83 are opened, a first driving unit 71 is configured similarly to the above embodiment. When the switches 82, 83 are closed, and the switches 81, 84 are opened, a second driving unit 72 is configured similarly to the above embodiment. Accordingly, also in such a first modification, it is possible to simplify the control while avoiding the pull-in phenomenon, similarly to the above embodiment.

Figure 5:
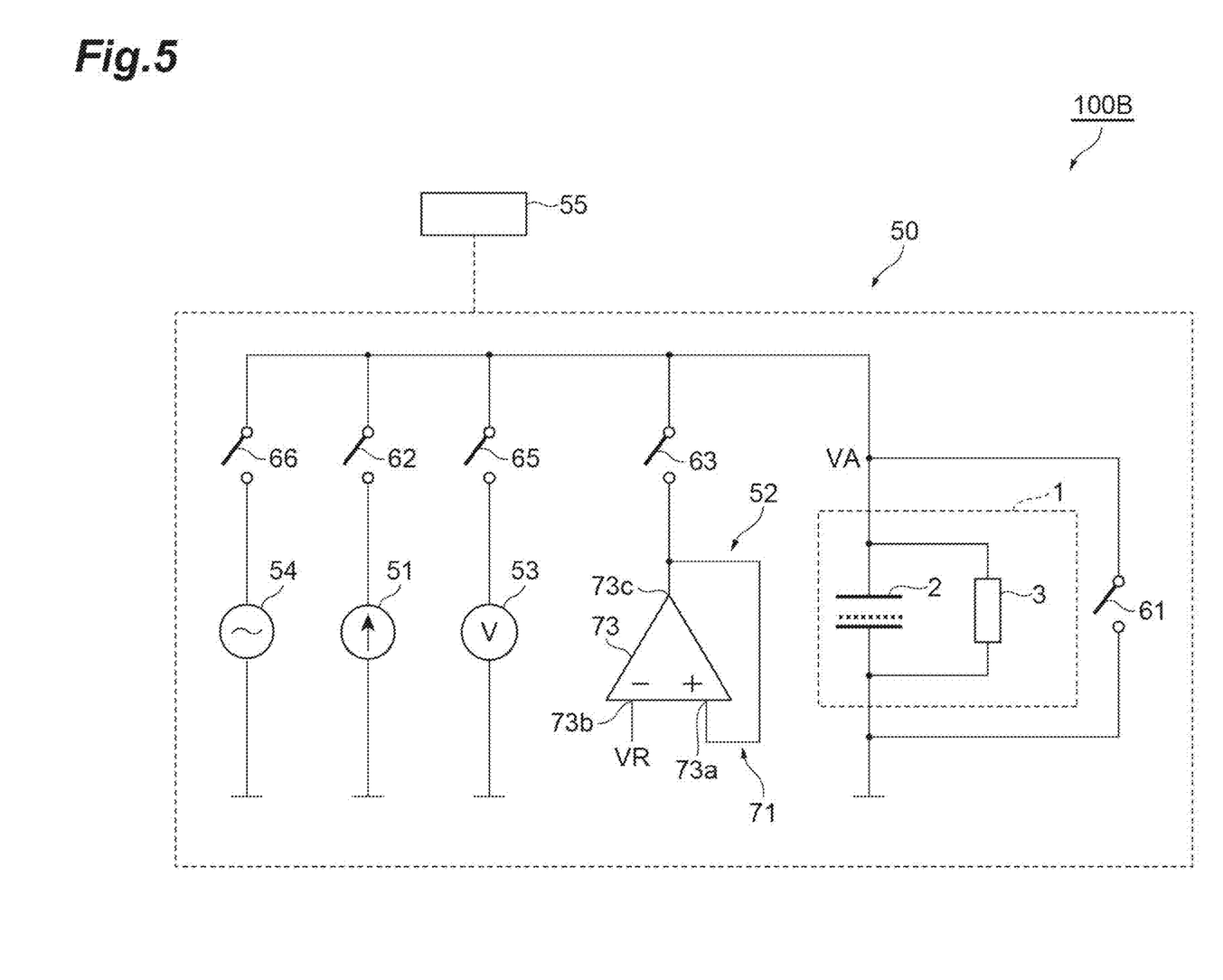
FIG. 5 is a configuration diagram of an optical filter system according to a second modification.

The optical filter system 100 may be configured like an optical filter system 100B of a second modification illustrated in FIG. 5. In the second modification, a second driving source 52 does not have a second driving unit 72, but has only a first driving unit 71. In the second modification, a control unit 55 controls a first driving source 51 and the second driving source 52 in such a way that a distance between mirrors is changed by the first driving source 51 in a third region R3. Also in such a second modification, it is possible to simplify the control while avoiding the pull-in phenomenon, similarly to the above embodiment. In the second modification, a control device 50 comprises a general voltage controller, and in the third region R3, a voltage VA is changed by the voltage controller, so that the inter-mirror distance may be adjusted. In this case, the voltage controller may not be configured as a voltage stabilizer like the second driving unit 72.

In the above embodiment, the control unit 55 may control the first driving source 51 and the second driving source 52 in such a way that the inter-mirror distance is changed by the first driving source 51 in the first region R1 and the second region R2, and the inter-mirror distance is changed by the second driving unit 72 of the second driving source 52 in the third region R3. In this case, the second driving source 52 may not have the first driving unit 71, but may have only the second driving unit 72. Also in such a modification, it is possible to simplify the control while avoiding the pull-in phenomenon, similarly to the above embodiment. That is, the second driving source 52 may be used in at least one part of the regions other than the first region R1. The current application unit 54 may not be necessarily provided. The current application unit 54 may be a device (equipment) serving as the voltage detection unit 53. In the second region R2 and the third region R3, the voltage detection unit 53 may be connected to the Fabry-Perot interference filter 1. In this case, the voltage VA can be monitored based on the detection result of the voltage detection unit 53. In the above embodiment, the first driving electrode 12 may not constitute the first mirror part 31. The first driving electrode may be a metal film disposed on the surface 22b of the first laminated body 22. Similarly, the second driving electrode 14 may not constitute the second mirror part 32. The second driving electrode may be a metal film disposed on a surface facing the surface 22b in the second laminated body 24.

REFERENCE SIGNS LIST

100: optical filter system, 1: Fabry-Perot interference filter, 12: first driving electrode, 14: second driving electrode, 31: first mirror part, 32: second mirror part, 50: control device, 51: first driving source, 52: second driving source, 53: voltage detection unit, 54: current application unit, 55: control unit, 71: first driving unit, 72: second driving unit, 73: operational amplifier, 73a: non-inverting input terminal, 73b: inverting input terminal, 73c: output terminal, 74: operational amplifier, 74a: non-inverting input terminal, 74b: inverting input terminal, 74c: output terminal, 75: operational amplifier, 75a: non-inverting input terminal, 75b: inverting input terminal, 75c: output terminal, R1: first region, R2: second region, R3: third region, S: void

The invention claimed is:

1. A control device for controlling a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the control device comprising:
   a first driving source that is controlled by using a current as a control parameter, and changes the distance between the pair of mirror parts;
   a second driving source that is controlled by using a voltage as a control parameter, and changes the distance between the pair of mirror parts; and
   a control unit that controls the first driving source and the second driving source in such a way that the distance between the pair of mirror parts is changed by the first driving source without using the second driving source in a first region and the distance between the pair of mirror parts is changed by the second driving source without using the first driving source in at least a part of a region other than the first region when a region including a maximum of the voltage in relation between the charges stored between the pair of driving electrodes, and the voltage between the pair of driving electrodes is defined as the first region.

2. The control device according to claim 1, wherein the control unit controls the first driving source and the second driving source in such a way that the distance between the pair of mirror parts is changed by the second driving source in a second region when an region in which the charges are larger than the charges in the first region in the relation is defined as the second region.

3. The control device according to claim 2, wherein
the second driving source has a first driving unit,
the first driving unit is configured in such a way that:
when a control voltage of the first driving unit is larger than the voltage generated between the pair of driving electrodes, the distance between the pair of mirror parts increases; and
when the control voltage of the first driving unit is smaller than the voltage generated between the pair of driving electrodes, the distance between the pair of mirror parts decreases, and
the control unit controls the first driving source and the second driving source in such a way that the distance between the pair of mirror parts is changed by the first driving unit in the second region.

4. The control device according to claim 3, wherein
the first driving unit includes an operational amplifier, and
in the operational amplifier, a non-inverting input terminal is connected to an output terminal, the output terminal is connected to the Fabry-Perot interference filter, and the control voltage is applied to an inverting input terminal.

5. The control device according to claim 1, wherein
the control unit controls the first driving source and the second driving source in such a way that the distance between the pair of mirror parts is changed by the second driving source in a third region when an region in which the charges are smaller than the charges in the first region in the relation is defined as the third region.

6. The control device according to claim 5, wherein
the second driving source has a second driving unit,
the second driving unit is configured in such a way that:
when a control voltage of the second driving unit is larger than the voltage generated between the pair of mirror parts, the distance between the pair of mirror parts decreases; and
when the control voltage of the second driving unit is smaller than the voltage generated between the pair of mirror parts, the distance between the pair of mirror parts increases, and
the control unit controls the first driving source and the second driving source in such a way that the distance between the pair of mirror parts is changed by the second driving unit in the third region.

7. The control device according to claim 6, wherein
the second driving unit includes an operational amplifier, and
in the operational amplifier, an inverting input terminal is connected to an output terminal, the output terminal is connected to the Fabry-Perot interference filter, and the control voltage is applied to a non-inverting input terminal.

8. The control device according to claim 1, further comprising a voltage detection unit that detects the voltage generated between the pair of driving electrodes, wherein
when the distance between the pair of mirror parts is changed by the first driving source, the control unit feedback-controls the first driving source based on a detection result of the voltage detection unit.

9. The control device according to claim 8, wherein
the control unit switches use states of the first driving source and the second driving source from a state in which the distance between the pair of mirror parts is changed by the first driving source to a state in which the distance between the pair of mirror parts is changed by the second driving source based on a detection result of the voltage detection unit.

10. The control device according to claim 1, wherein
the control unit switches use states of the first driving source and the second driving source from a state in which the distance between the pair of mirror parts is changed by the second driving source to a state in which the distance between the pair of mirror parts is changed by the first driving source based on a control voltage of the second driving source.

11. The control device according to claim 1, further comprising:
a current application unit that applies an alternating current having a frequency higher than a resonance frequency of the pair of mirror parts between the pair of driving electrodes; and
a voltage detection unit that detects a voltage generated between the pair of driving electrodes during application of the alternating current, wherein
the control unit calculates electrostatic capacity between the pair of driving electrodes based on a detection result of the voltage detection unit.

12. The control device according to claim 1, wherein
the first driving source is capable of supplying and absorbing a current.

13. An optical filter system comprising:
the control device according to claim 1; and
the Fabry-Perot interference filter controlled by the control device.

14. A control method for controlling a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the control method comprising:
changing the distance between the pair of mirror parts by a first driving source without using a second driving source in a first region and changing the distance between the pair of mirror parts by the second driving source without using the first driving source in at least a part of a region other than the first region when a region including a maximum of the voltage in relation between the charges stored between the pair of driving electrodes, and the voltage between the pair of driving electrodes is defined as the first region, by using:
the first driving source that is controlled by using a current as a control parameter, and changes the distance between the pair of mirror parts; and
the second driving source that is controlled by using a voltage as a control parameter, and changes the distance between the pair of mirror parts.

* * * * *